June 30, 1953 H. D. ROUTMAN 2,643,398
BABY BLANKET AND HARNESS
Filed Oct. 23, 1951
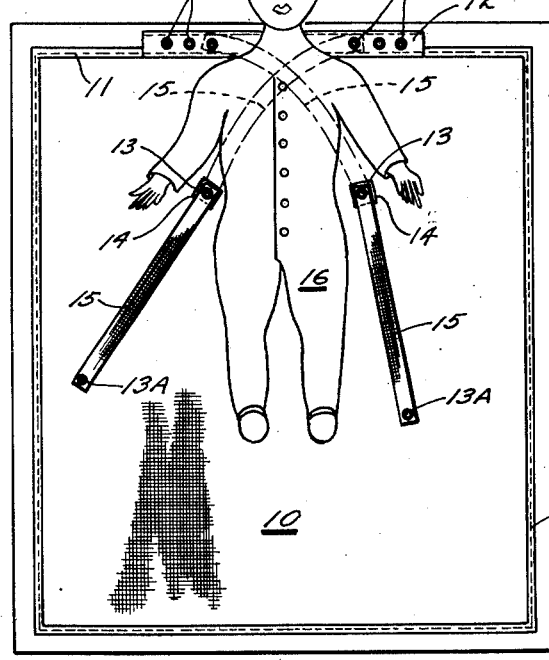
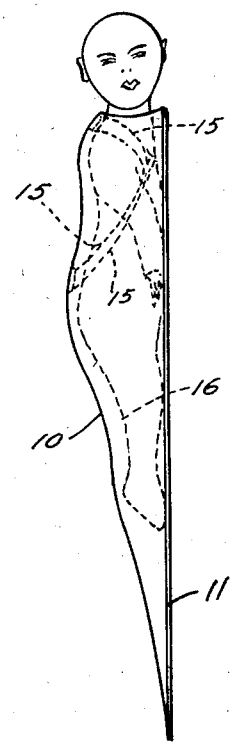
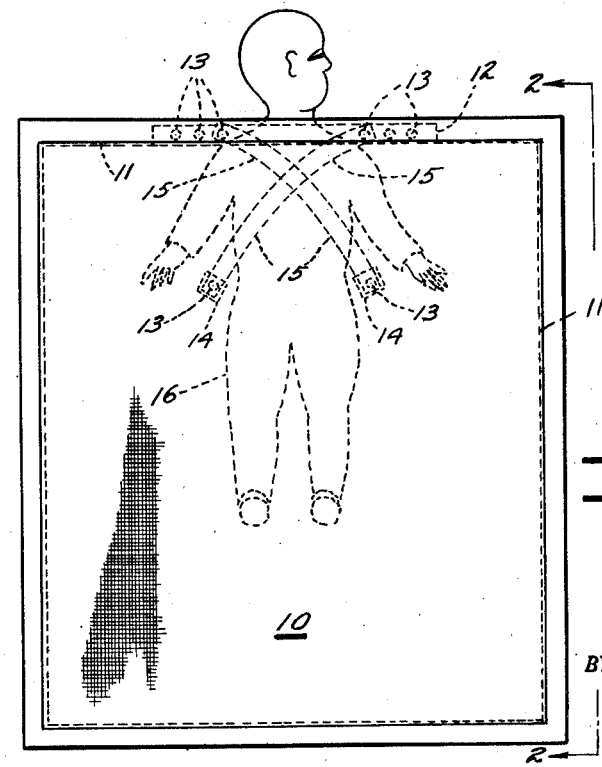
INVENTOR.
Helen D. Routman.
BY W. B. Hauptman
ATTORNEY.

Patented June 30, 1953

2,643,398

UNITED STATES PATENT OFFICE 2,643,398

BABY BLANKET AND HARNESS

Helen D. Routman, Sharon, Pa.

Application October 23, 1951, Serial No. 252,597

2 Claims. (Cl. 5—334)

This invention relates to a baby blanket and more particularly to a baby blanket incorporating an adjustable harness for securing a blanket to a baby.

The principal object of the invention is the provision of a baby blanket and harness combination.

A further object of the invention is the provision of a baby blanket and harness combination of inexpensive design and construction operating to secure the blanket to the baby in such a manner that the baby cannot crawl out from in under the blanket or otherwise become uncovered.

A still further object of the invention is the provision of a baby blanket and harness combination which is readily adjustable and adaptable to various sizes of babies and one which is easily attached to the baby and is incapable of harming the baby.

The baby blanket and harness combination disclosed herein comprises a simple and efficient means of insuring the positioning of a blanket on a baby. It is well known that infants are normally positioned in their cribs on their stomachs for sleeping and that in such position the baby turns from side to side and is able to draw up its knees and move about the crib. It is also known that it is extremely difficult to maintain a blanket or other covering on the baby due to the baby's movements and tendency to crawl out or move out from in under the blanket.

The present invention comprises a baby blanket of sufficient size to adequately cover the baby in reclining position and is provided with separable strap-like sections forming a harness when crossed over the baby's body and secured at their opposite ends to the blanket. The blanket is thus yieldingly attached to the baby and in normal position over the baby's back. At such time as the baby rolls to the right or left, the side portions of the blanket will adequately cover the baby. At such time as the baby crawls upwardly or downwardly, the blanket will follow due to its attachment to the baby's body through the straps forming the harness.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a top plan view of a baby in position on the blanket, solid lines indicating the harness straps in unattached position and dotted lines indicating the position of the harness straps in attached position.

Figure 2 is a side elevation of the baby blanket and harness combination in position on a baby.

Figure 3 is a top plan view of the baby blanket and harness combination in position on a baby in reclining position.

By referring to the drawings and Figure 1 in particular it will be seen that a baby blanket 10 has its edges defined by a hem 11 which extends along the sides and across the ends of the blanket 10. In Figure 1 of the drawings the back side of the blanket is shown uppermost and it will be seen that a tape 12 has been attached to the blanket adjacent one of its ends and transversely with respect thereto so as to overlie the hem 11. The tape 12 has portions of a plurality of snap fasteners 13 attached thereto and acts as a reinforcing mounting for these portions of the snap fasteners 12. Spaced inwardly on the blanket 10 and still on the back side thereof there are a pair of smaller tape sections 14, each of which has half of a snap fastener 13 thereon. The pairs of tape sections 14 are spaced with respect to one another a distance sufficient to enable a baby to be positioned therebetween and they are also spaced inwardly on the blanket 10 a distance from the tape 12 to enable the upper half of a baby's body to be disposed therebetween. A pair of belts 15—15 are provided at their opposite ends with the other halves of the snap fasteners 13, the same being indicated by the numerals 13A. As illustrated in Figure 1 of the drawings it will be observed that the belts 15 are shown in solid lines attached to the snap fasteners 13 on the tape sections 14.

A baby in the usual sleeping garment 16 is partially illustrated in position on its back on the back side of the blanket 10 between the tape sections 14 and with its neck between the spaced plurality of fasteners 13 on the tape 12. When the baby is in such position, the belts 15 are moved into criss-cross relation, as shown in dotted lines, the belts 15 crossing the chest of the baby and extending over its shoulders and attached to the fasteners 13 on the tape 12 at their one end and extending in the opposite direction downwardly across the sides of the baby and attached to the tape sections 14 at their other ends. The belts 15 are preferably formed of soft elastic material or a comparable yieldable substance so that they will yield to the shape and motion of the baby and at the same time act to secure the blanket 10 to the baby.

It will be observed that the plurality of portions of fasteners 13 on the tape 12 enable different sizes of babies to be readily accommodated as the portions of the belts 15 passing over the shoulders of the baby may be moved outwardly or inwardly in oppositely disposed relation according to the size of the baby.

When the blanket has been secured to the baby through the fastening of the belts 15, as hereinbefore described, the baby is then positioned in its crib, face down as is customary, whereupon the blanket is positioned over the back of the baby with the front side of the blanket in uppermost position and the back side of the blanket adjacent the back of the baby. Such positioning of the baby is shown in Figure 2 of the drawings and it will be observed that the blanket adequately covers the baby as it is wider than the total width of the baby and its arms and it is longer than the total length of the baby from its neck to its feet. It will also be observed that the hem 11 defining the end of the blanket disposed across the area of the neck of the baby is properly disposed with respect to desirable covering of the baby.

A similar figure taken on a top plan view is illustrated in Figure 3 of the drawings and by referring thereto it will be observed that the baby is completely covered by the blanket 10 and it will also be observed that the baby is entirely free to move about beneath the blanket 10 as its arms are free as well as its legs. It will thus be seen that the blanket will follow the baby's movements due to the four-point attachment to the belts 15 which are crossed beneath the baby's body in normal sleeping position. At such time as the baby turns on its side, the side portion of the blanket will be of sufficient length and in proper position to cover the baby and at such time as the baby draws up its knees and crawls, the blanket will move along with the baby due to its secure position with respect thereto.

It will thus be seen that the several objects of the invention are met by the simple and efficient combination of the harness and blanket. It will be observed by those skilled in the art that the entire combination is readily washable and that the belts 15 may be inexpensively replaced when necessary that in use the combination results in a practical and efficient manner of insuring the covering of the baby at all times.

Having thus described my invention, what I claim is:

1. A baby blanket comprising a section of blanket material of sufficient size to more than cover all but the head of a baby and providing an area for directly covering the body of the baby, a pair of spaced snap fastening means at one edge portion of the blanket section and within said area, the spacing between said fastening means being such as to receive the neck of the baby therebetween, additional spaced snap fastening means directly carried by said blanket section inwardly of said one edge portion and arranged on opposite sides of said area so as to be on either side of the body below the arms of the baby, and belts having cooperating fastening means in direct attachment to said first named and additional fastening means of the blanket section in order that said belts can be criss-crossed against the body thereby holding the blanket section against the baby regardless of the movements of the baby.

2. A baby blanket comprising a section of blanket material of sufficient size to more than cover all but the head of a baby and providing an area for directly covering the body of the baby, a plurality of pairs of spaced fastening means at one edge portion of the blanket section and within said area, the spacing between the pairs of fastening means being such as to receive the neck of the baby therebetween, additional spaced fastening means directly secured to said blanket section inwardly of said one edge portion and arranged on opposite sides of said area so as to be on either side of the body below the arms of the baby, and a pair of belts having cooperating fastening means at both of their ends in direct attachment of corresponding ends of said belts to said additional fastening means, the other ends of said belts being free for criss-crossing over the baby and secured to a preselected pair of said first recited fastening means whereby the blanket can be held against the baby regardless of the movements of the baby.

HELEN D. ROUTMAN.

References Cited in the file of this patent

UNITED STATES PATENTS

| Number | Name | Date |
|---|---|---|
| 1,502,608 | Young | July 22, 1924 |
| 2,589,708 | Koster | Mar. 18, 1952 |